United States Patent [19]

Matzner et al.

[11] Patent Number: 4,459,384
[45] Date of Patent: Jul. 10, 1984

[54] PROCESS FOR PREPARING POLYESTERS OR POLY(ESTER CARBONATES) IN THE PRESENCE OF A PROCESSING AID

[75] Inventors: Markus Matzner, Edison; Louis M. Maresca, Belle Mead, both of N.J.

[73] Assignee: Union Carbide Corporation, Danbury, Conn.

[21] Appl. No.: 485,823

[22] Filed: Apr. 18, 1983

Related U.S. Application Data

[63] Continuation of Ser. No. 319,402, Nov. 9, 1981, abandoned.

[51] Int. Cl.$^3$ .................. C08G 63/64; C08L 69/00
[52] U.S. Cl. .................... 524/876; 524/718; 524/744; 524/750; 524/755; 524/878; 528/182; 528/179; 528/194

[58] Field of Search ............ 528/179, 198, 182, 194; 525/439, 466; 524/718, 744, 750, 755, 845, 878, 876

[56] References Cited

U.S. PATENT DOCUMENTS

| | | | |
|---|---|---|---|
| 3,395,119 | 7/1968 | Blashke et al. | 528/180 |
| 4,294,957 | 10/1981 | Berger et al. | 528/179 |
| 4,296,232 | 10/1981 | Maresca et al. | 528/179 |

Primary Examiner—Theodore E. Pertilla
Attorney, Agent, or Firm—Donald M. Papuga

[57] ABSTRACT

Described herein is a process for preparing a polyester or a poly(ester carbonate) which comprises reacting a dihydric phenol with an aromatic diacid and a diaryl carbonate in the presence of from about 10 to about 60 weight percent of a processing aid under polyester or poly(ester carbonate) forming conditions.

18 Claims, No Drawings

PROCESS FOR PREPARING POLYESTERS OR POLY(ESTER CARBONATES) IN THE PRESENCE OF A PROCESSING AID

This application is a continuation of our prior U.S. application Ser. No. 319,402, filing date: Nov. 9, 1981, abandoned.

BACKGROUND OF THE INVENTION

This invention is directed to a process for preparing a polyester or a poly(ester carbonate) which process comprises reacting a dihydric phenol with an aromatic diacid and a diaryl carbonate in the presence of from about 10 to about 60 weight percent, based on the weight of the polyester produced, of a processing aid under polyester or poly(ester carbonte) forming conditions.

Polyarylates are polyesters derived from a dihydric phenol, particularly 2,2-bis(4-hydroxyphenyl) propane, also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Similarly, polyarylate copolymers containing carbonate linkages, i.e., poly(ester carbonates) display an excellent combination of properties.

Many processes have been described in the literature for the preparation of polyesters and poly(ester-carbonates). One such process reacts a dihydric phenol, a diacid and a diaryl carbonate. Specifically, this latter process involves the reaction of a dihydric phenol, iso- or terephthalic acids, or mixtures thereof, and a diaryl carbonate at temperatures of from about 260° to about 350° C. Optionally, a catalyst may be used.

The utilization of from about 10 to about 60 percent of a processing aid is beneficial in preparing polyesters and poly(ester carbonates) in that the viscosity of the system is decreased. This decrease in viscosity provides a faster reaction time since better mixing of the reactants occurs which allows the reaction to proceed under kinetic control. Additionally, by using the processing aid, reaction times are relatively short so that the polyester or poly(ester carbonate) produced possess vastly improved color, as compared to those prepared under reaction conditions described in the prior art.

Finally, the use of the processing aid prevents the occurrence of undesirable "hot spots" which produce colored degradation products which contribute to the color and instability of the polyester or poly(ester carbonate).

DESCRIPTION OF THE INVENTION

The present invention is directed to a process for the preparation of a polyester or a poly(ester carbonate) which process comprises reacting a dihydric phenol with an aromatic diacid and a diaryl carbonate in the presence of from about 10 to about 60 weight percent, based on the weight of the polyester or poly(ester carbonate) produced, of a processing aid, under polyester or poly(ester carbonate) forming conditions.

The dihydric phenols that may be used in this invention include the following:
2,2-bis(4-hydroxyphenyl)propane,
bis-(2-hydroxyphenyl)methane,
bis-(4-hydroxyphenyl)methane
bis-(4-hydroxy-2,6-dimethyl-3-methoxyphenyl)methane
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-methyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)propane,
4,4'-(dihydroxyphenyl)ether,
4,4'-(dihydroxyphenyl)sulfide,
4,4'-(dihydroxyphenyl)sulfoxide,
hydroquinone, and
naphthalene diols.

Furthermore, up to 80 mole percent of the diol component may be an aliphatic diol such as ethylene glycol, neopentyl glycol, and the like.

The aromatic diacid which can be used herein includes terephthalic acid, isophthalic acid, orthophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. A variety of other aromatic dicarboxylic acids is useful. These include 4,4'-biphenyl dicarboxylic acid, 4,4'-diphenyloxide dicarboxylic acid, their substituted derivative, etc. Moreover, hydroxyaromatic acids, i.e. 4-hydroxybenzoic acid and the like, are useful. Preferably, mixtures of isophthalic and terephthalic acids are used. The isophthalic acid to terephthalic acid ratio in the mixture is about 20:80 to about 100:0 while the most preferred acid ratio is about 25:75 to about 75:25. Also, from about 0.5 to about 20 percent of aliphatic diacids containing from 2 to about 10 carbon atoms, such as adipic acid, sebacic acid, and the like may be additionally used in the polymerization reaction.

The diaryl carbonate is preferably diphenyl carbonate.

The preparation of the polyester or poly(ester carbonate) is carried out in the presence of from about 10 to about 60, more preferably from about 25 to about 60, and most preferably, from about 30 to about 60 weight percent, based on the weight of the polyester or poly(ester carbonate) produced, of a processing aid.

The preferred processing aids are diphenyl ether compounds, a cycloaliphatic, substituted aromatic, or heteroaromatic compound, and a halogenated and/or etherated substituted aromatic or heteroaromatic compound, or mixtures of these.

The diphenyl ether compound may be substituted. These substituents are selected from alkyl groups, chlorine, bromine or any substituent which does not interfere with the polyester or poly(ester carbonate) forming reaction. Additionally, the diphenyl ether compound may be used with up to 50 weight percent of other compounds, such as various biphenyls or any other compounds which do not interfere with the polyester or poly(ester carbonate) forming reaction.

The cycloaliphatic compounds, or substituted aromatic or heteroaromatic compounds contain at least one benzylic and/or tertiary hydrogen atom. These compounds have a boiling point of from about 200° to about 280° C., at atmospheric pressure. Additionally, these compounds have a solubility parameter, at a temperature of 250° C., of ±4 within the solubility parameter of the polyester being produced. Solubility parameter is a measure of correlating polymer solvent interaction. It is defined in "Properties of Polymers", D. W. Van Krevelen, Elsevier Scientific Publishing Co., Amsterdam-Oxford-New York, 1976, pp. 141–155, as the square root of the cohesive energy density.

The cycloaliphatic compounds are of the following formulae:

   (I)

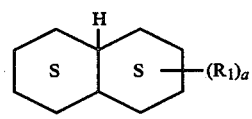   (II)

wherein $R_1$ is independently alkyl of 1 to 6 carbon atoms, cycloalkyl of 6 to 18 carbon atoms, and a is an integer of 1 to 2.

The substituted aromatic compounds are of the following formula:

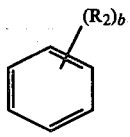   (III)

wherein $R_2$ is independently cylcoalkyl of 6 to 18 carbon atoms and aralkyl and alkaryl of 7 to 18 carbon atoms and wherein the carbon atom of $R_2$ attached directly to the benzene nucleus has 1 to 2 attached hydrogen atoms, and b is an integer of 1 to 6.

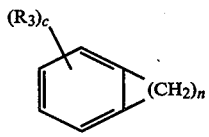   (IV)

wherein $R_3$ is independently alkyl of 1 to 6 carbon atoms, cycloalkyl of 6 to 18 carbon atoms, c is an integer of 1 or 2, and n is an integer of 1 to 6.

The heteroaromatic compounds are of the following formula:

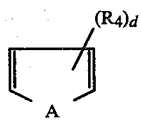   (V)

wherein A is S, O, or —CH=N—, $R_4$ is independently alkyl of 1 to 6 carbon atoms, or cycloalkyl of 6 to 18 carbon atoms and wherein the cabon atom of $R_4$ attached directly to the heteroaromatic nucleus has 1 or 2 attached hydrogen atoms, and d is an integer of 1 to 4.

Additionally, the cycloaliphatic, substituted aromatic or heteroaromatic compounds may be used with up to 90 weight percent of other compounds such as diphenyl ether, dimethylsulfone, etc.

The halogenated and/or etherated substituted aromatic or heteroaromatic compounds are of the formulae:

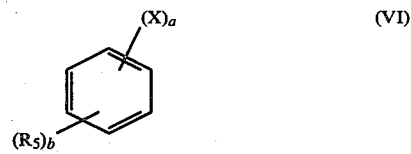   (VI)

wherein X is independently Cl, Br F, or $OR_6$, a is an integer of 1 to 5, $R_5$ is independently alkyl of 1 to 16 carbon atoms, cycloalkyl of 6 to 18 carbon atoms, aryl of 6 to 18 carbon atoms, or aralkyl or alkaryl of 7 to 18 carbon atoms, $R_6$ is independently alkyl of 1 to 16 carbon atoms or cycloalkyl of 6 to 18 carbon atoms, and b is integer of 0, 1 or 2;

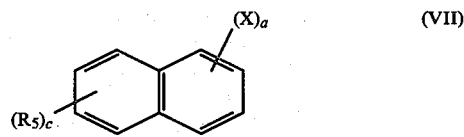   (VII)

wherein X, $R_1$ and a are as previously defined, and c is an integer of 0 to (8-a).

The heteroaromatic compounds are of the following formula:

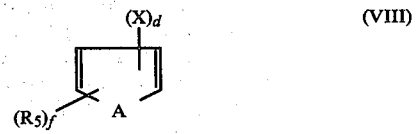   (VIII)

wherein A is O, S, or —CH=N—, X and $R_5$ are as previously defined, d is an integer of 1 to 4 and f is integer of 0 to (4-d).

The compounds encompassed by structures (VI) through (VIII) include 1,2,3-trichlorobenzene; 1,2,4-trichlorobenzene, 1,2,3- or 1,2,4- or 1,3,5-trimethoxy-benzene; 1,2- or 1,3- or 1,4-dibromobenzene; 1-chloronaphthalene; 2-chloronaphthalene; 1-bromona-phthalene; 2-bromonaphthalene; 1,2- or 1,3- or 1,4-dimethoxybenzene; 2-bromotoluene; 4-bromotoluene; 2-bromoanisole; 3-bromoanisole and 4-bromoanisole.

Additionally, the halogenated and/or etherated substituted aromatic or heteroaromatic compounds may be used with up to 90 weight percent of other compounds such as diphenyl ether, dimethylsulfone, diphenyl sulfone etc.

The amount of said processing aid could vary during the polymerization reaction. For example, it may be advantageous to increase progressively the amount of these processing aids to maintain the reaction medium at constant viscosity.

A catalyst may be used to accelerate the transesterification reaction. Examples of catalysts are elemental metals such as sodium, potassium, lithium, calcium, magnesium, barium, tin, strontium, zinc, iron, aluminum, cobalt, lead, nickel, titanium, manganese, or antimony, and compounds of these metals such as their oxides, hydrides, hydroxides, halides, inorganic acid salts, organic acid salts, complex salts, double salts, alcoholates, or phenolates. Preferred catalysts include alkali and alkaline earth metal alkoxides and phenoxides. Other preferred catalysts include titanium compounds such as titanium tetrabutoxide, titanium oxalate, or titanium oxide, tin compounds such as dibutyltin oxide, antimony compounds, such as antimony trioxide, and silicon tin compounds such as the following:

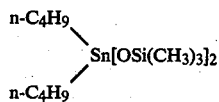

The catalyst is present in the reaction mixture in a catalytically effective amount which can be, for example, from about 1 to about 1000, preferably from about 10 to about 200 parts per million, based on the weight of the polyester produced.

The polyester or poly(ester carbonate) may be prepared by adding the dihydric phenol, aromatic diacid, diaryl carbonate, processing aid, and optionally catalyst to a reaction zone and carrying out the polymerization. Any combination of adding the dihydric phenol, the aromatic diacid, diaryl carbonate, processing aid, and optionally catalyst, to a reaction vessel may be used.

The polymerization process of this invention is carried out under polyester or poly(ester carbonate) forming conditions, i.e., at a temperature of from about 200° to about 350° C., and preferably, from about 250° to about 330° C. The polymerization process in generally conducted in an inert atmosphere (such as argon or nitrogen) so that the oxygen content therein is minimized or eliminated. The process is preferably carried out at a pressure sufficient to have the processing aid refluxing at the reaction temperature. This pressure is generally atmospheric. Lower and higher pressures may also be used.

The polymerization reaction is conducted for a period of time sufficient to produce a polyester or a poly(ester carbonate), having a reduced viscosity of at least about 0.1 to greater than 1.0 dl/gm, which time is generally less than about 10 hours. The reaction time is generally in the range of from about 4 hours to about 8 hours, depending on the particular polyester or poly(ester carbonate) being prepared.

The polymerization reaction of this invention may be carried out batchwise or continuously and by using any apparatus desired.

The diacids and diaryl carbonate may be prereacted first, then the dihydric phenol added or the dihydric phenol and diaryl carbonate can be prereacted and then the diacids added.

The process of this invention produces polyesters or poly(ester carbonates) having a reduced viscosity of from about 0.1 to greater than about 1.0, preferably from about 0.2 to about 0.8 dl/gm, as measured in chloroform (0.5 g/dl chloroform) or other suitable solvent at 25° C. or another suitable temperature. In those instances where the polyester or poly(ester carbonate) is not soluble in chloroform, other solvents known in the art, such as para-chlorophenol, phenol/tetrachloroethane (60:40), and the like, may be used. Reduced viscosities of the polyesters or poly(ester carbonate) measured in these solvents generally have the same range as those measured in chloroform.

The polyesters or poly(ester carbonates) may be prepared in the presence of additives such as molecular weight regulators, antioxidants, and the like.

In another embodiment of this invention the polymerization reaction can be carried out in the presence of one or more thermoplastic polymers such as polyesters, polycarbonates, styrene polymers, alkyl acrylate polymers, polyurethanes, poly(aryl ether) polymers, polyamides, polyimides, poly(amide imides), poly(ether imides), polyhydroxy ether polymers, copolyetherester block copolymers, and the like to produce novel polymeric materials.

The polyesters or poly(ester carbonates) obtained by the process of this invention may be used together with the well-known additives such as plasticizers, pigments, lubricating agents, mold release agents, stabilizers, inorganic fillers, and the like.

EXAMPLES

The following examples serve to give specific illustrations of the practice of this invention but they are not intended in any way to limit the scope of this invention.

EXAMPLE 1

A three neck 250 milliliter round bottom flask was equipped with a mechanical stirrer, a nitrogen inlet and a vacuum jacketed vigreux column with a distillation head and receiver. The flask was charged with 8.30 g (0.050 moles) of isophthalic acid, 8.30 g (0.050 moles) of terephthalic acid, 22.80 g (0.100 moles) of bisphenol A, 43.23 g (0.202 moles) of diphenyl carbonate and 23.87 g of diphenyl ether. The reaction system was flushed with nitrogen for 1 hour at room temperature (about 25° C.). While maintaining a constant nitrogen purge, 0.04 g of tetra-n-butyl titanate was added to the mixture and the reaction was heated to 250° C. Phenol began to distill. After 1 hour at 250° C., the reaction temperature was raised to 280° C. where it was allowed to remain for an additional 5 hours. Upon cooling to room temperature the reaction mixture was dissolved in 200 ml of methylene chloride. Coagulation in 1000 ml of methanol resulted in the percipitation of the polyester as a white powder. After several methanol washes, the polymer was dried in a vacuum oven for about 12 hours at 120° C.

The reduced viscosity of the dried polymer was measured in chloroform (0.50 g/100 ml) at 25° C. and found to be 0.17 dl/g.

EXAMPLE 2

The proceedure described in Example 1 was repeated exactly except that di(trimethylsilyloxy)-di-n-butyl tin was used instead of the tetra-n-butyl titanate.

The resulting polymer had a reduced viscosity of 0.17 dl/g.

EXAMPLE 3

The proceedure described in Example 1 was repeated exactly except that di(trimethylsilyloxy)-di-n-butyl tin was used instead of tetra-n-butyl titanate and 1,3,5-trimethoxy benzene was used instead of diphenyl ether.

The resulting polymer had a reduced viscosity of 0.18 dl/g.

In all instances higher molecular weight product could be obtained by removing the processing aid and phenol under reduced pressure at temperatures of between about 250° and 350° C. This could be accomplished in the reactor or in an extruder; for example in a vented extruder. In the case of the polymers prepared in Example 1 to 3, prior to dissolving them in methylene chloride a small sample of each was heated in a test tube at a pressure of 0.2 mm of Hg at 300° C. for 1 hour. Following the standard work described in Example 1 the reduced viscosity of each was measured.

The results are shown in Table I.

TABLE I

| Sample | Reduced Viscosity Prior to Heat Treatment[1] | Reduced Viscosity After Heat Treatment[1] |
| --- | --- | --- |
| Example 1 | 0.17 | 0.38 |
| Example 2 | 0.18 | 0.40 |
| Example 3 | 0.18 | 0.40 |

[1]300° C. at 0.2 mm of Hg for 1 hour.

What is claimed is:

1. A process for preparing a poly(ester carbonate) which comprises reacting a dihydric phenol with an aromatic diacid and a diaryl carbonate in the presence of from about 10 to about 60 weight percent of a processing aid which is selected from diphenyl ether compounds, a cycloaliphatic, substituted aromatic, or substituted heterocyclic compound and a halogenated and/or etherated substituted aromatic or heteroaromatic compound or mixtures of these, under poly(ester carbonate) forming conditions to produce a poly(ester carbonate) having a reduced viscosity of at least about 0.1 dl/gm.

2. A process as defined in claim 1 wherein the processing aid comprises a diphenyl ether compound.

3. A process as defined in claim 1 wherein the cycloaliphatic compounds are of the following formulae:

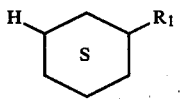

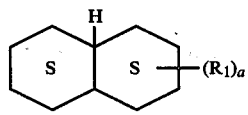

wherein $R_1$ is independently alkyl of 1 to 6 carbon atoms, cycloalkyl of 6 to 18 carbon atoms, and a is an integer of 1 or 2.

4. A process as defined in claim 1 wherein the substituted aromatic compounds are of the following formula

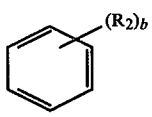

wherein $R_2$ is independently cycloalkyl of 6 to 18 carbon atoms and aralkyl or alkaryl of 7 to 18 carbon atoms and wherein the carbon atom of $R_2$ attached directly to the benzene nucleus has 1 to 2 attached hydrogen atoms, and b is an integer of 1 to 6, or

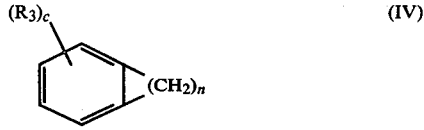

wherein $R_3$ is independently alkyl of 1 to 6 carbon atoms, cycloalkyl of 6 to 18 carbon atoms, c is an integer of 1 or 2, and n is an integer of 1 to 6.

5. A process as defined in claim 1 wherein the heteroaromatic compounds are of the following formula:

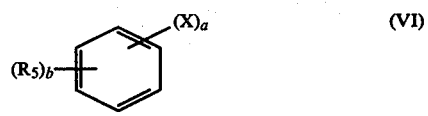

wherein A is S, O, or —CH=N—, $R_4$ is independently alkyl of 1 to 6 carbon atoms, or cycloalkyl of 6 to 18 carbon atoms and wherein the carbon atom of $R_4$ attached directly to the heteroaromatic nucleus has 1 or 2 attached hydrogen atoms, and d is an integer of 1 to 4.

6. A process as defined in claim 1 herein the halogenated and/or etherated substituted aromatic compounds are of the formulae:

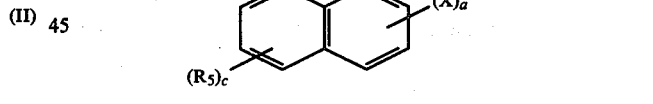

wherein X is independently Cl, Br, F, or $OR_6$, a is an integer of 1 to 5, $R_5$ is independently alkyl of 1 to 16 carbon atoms, cycloalkyl of 6 to 18 carbon atoms, aryl of 6 to 18 carbon atoms, or aralykyl or alkaryl of 7 to 18 carbon atoms, $R_6$ is independently alkyl of 1 to 16 carbon atoms or cycloalkyl of 6 to 18 carbon atoms, and b is an integer of 0, 1 or 2; or wherein X, $R_1$ and a are as previously defined, and c is an integer of 0 to (8-a).

7. A process as defined in claim 1 wherein the halogenated and/or etherated substituted heteroaromatic compounds are of the following formula:

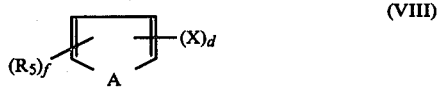

wherein A is O, S, or —CH=N—, X and $R_5$ are as previously defined, d is an integer of 1 to 4 and f is integer of 0 to (4-d).

8. A process of claim 1 wherein the process is carried out in the presence of a catalyst.

9. A process as defined in claim 8 wherein the catalyst is selected from elemental metals such as sodium, potassium, lithium, calcium, magnesium, barium, tin, strontium, zinc, iron, aluminum, cobalt, lead, nickel, titanium, maganese, or antimony, and compounds of these metals such as their oxides, hydrides, hydroxides, halides, inorganic acid salts, organic acid salts, complex salts, double salts, alcoholates, or phenolates.

10. A process defined in claim 8 wherein the catalyst is an alkali or alkaline earth metal alkoxide or phenoxide.

11. A process as defined in claims 1 or 8 or 10 wherein the catalyst is of the following formula:

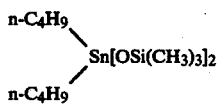

12. A process as defined in claim 1 wherein from about 0.5 to about 20 percent of an aliphatic diacid is added to the reaction mixture.

13. A process as defined in claim 1 wherein an aliphatic diol is added to the reaction mixture.

14. The process of claim 1 wherein the diaryl carbonate is diphenyl carbonate.

15. The process of claim 1 wherein the process is carried out at a temperature of from about 200° to about 350° C.

16. The process of claim 1 wherein the process is carried out in the presence of one or more thermoplastic polymers.

17. The process of claim 16 wherein the thermoplastic polymer is selected from polyesters, polycarbonates, styrene polymers, alkyl acrylate polymers, polyurethanes, poly(aryl ether) polymers, polyamides, polyimides, poly(amide imides), poly(ether imides), polyhydroxy ether polymers, and copolyetherester block copolymers.

18. A process for preparing a poly(ester carbonate) which comprises reacting a dihydric phenol with an aromatic diacid and a diaryl carbonate in the presence of from about 10 to about 60 weight percent of a processing aid selected from diphenyl ether compounds, a cycloaliphatic, substituted aromatic, or substituted heteroaromatic compound, and a halogenated and/or etherated substituted aromatic or heteroaromatic compound, or mixtures thereof, at a temperature of from about 200° to about 350° C., at a pressure sufficient to have the processing aid refluxing at the reaction temperature and for a period of time sufficient to produce a poly(ester carbonate) having a reduced viscosity of at least about 0.1 dl/gm.

* * * * *